April 1, 1941.  W. T. BOTTER  2,236,704

CLUTCH ACTUATING MECHANISM

Filed Dec. 14, 1938  2 Sheets-Sheet 1

Inventor:
WILLIAM T. BOTTER,
by John E. Jackson
his Attorney.

April 1, 1941.　　　W. T. BOTTER　　　2,236,704
CLUTCH ACTUATING MECHANISM
Filed Dec. 14, 1938　　　2 Sheets-Sheet 2
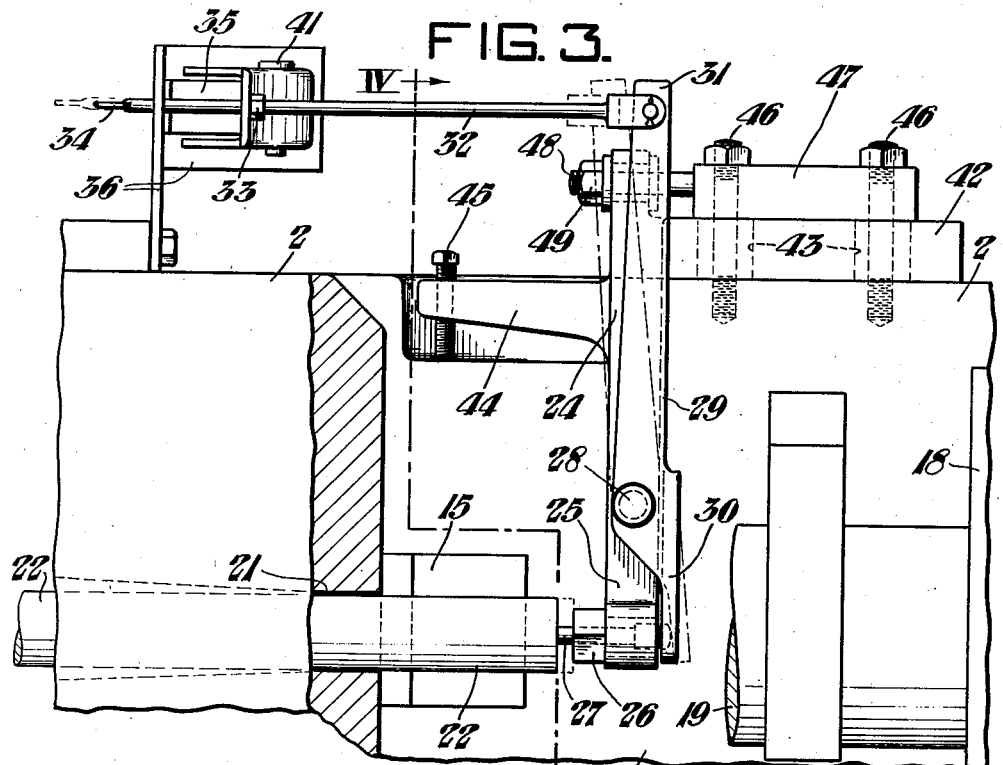
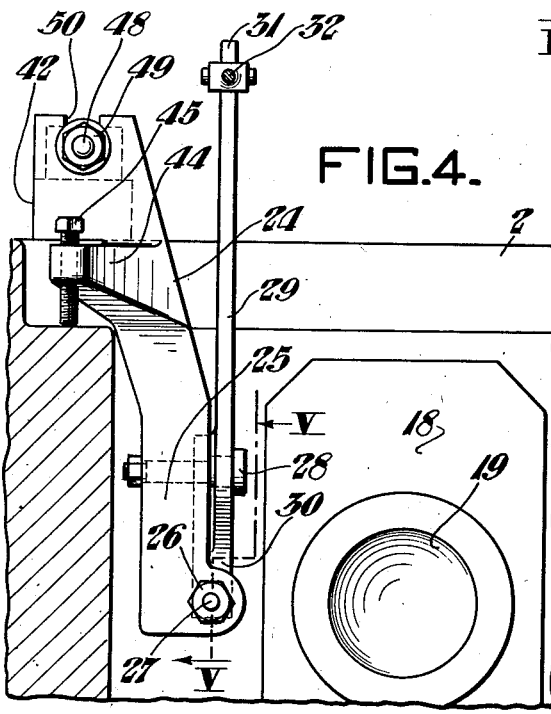
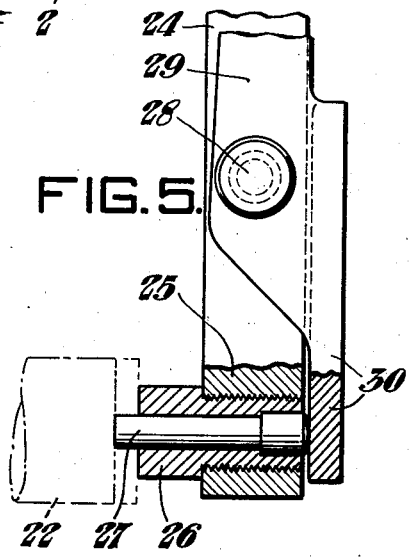
Inventor:
WILLIAM T. BOTTER,
by John E. Jackson
his Attorney.

Patented Apr. 1, 1941

2,236,704

UNITED STATES PATENT OFFICE 2,236,704

CLUTCH ACTUATING MECHANISM

William T. Botter, Johnstown, Pa.

Application December 14, 1938, Serial No. 245,745

9 Claims. (Cl. 164—47)

This invention relates to machines such as used for cutting material into predetermined lengths and, more particularly, to a mechanism for controlling the actuation of the clutch and cutting means therein, especially in machines such as employed in the manufacture of grinding balls and the like.

The present invention is shown incorporated with a clutch operated machine for making grinding balls but it will be understood that it may be incorporated with any clutch operated machine such as used for cutting stock into predetermined lengths, or any clutch operated machine in which forgings are produced by shearing a blank of the proper length from a length of rod or stock and forged in one working stroke or cycle, such as in machines used in the manufacture of gear blanks, drill points, piercer points, etc.

Usually, in such machines used for the manufacture of grinding balls and the like, the clutch therein is air operated. In some of these machines, certain sizes of balls or forgings, usually the smaller sizes, can be produced by running the machine continuously, and there is provided mechanical means for feeding the stock thereinto. However, in the manufacture of larger size balls and forgings, this is not practical and the stock has to be manually fed into the machine, and the machine or air clutch actuated only for one working stroke or cycle.

Heretofore, in machines employed for manufacturing large size balls or forgings, it was usually the practice to position a portable clutch actuating or tripping device on the floor at the end of the machine where the stock was fed thereinto, or at some other convenient point accessible to the operator when feeding the stock. Thus, the operator would not only have to feed the heavy rod or stock into the machine but he would also have to actuate means to trip the clutch throughout the length of the bar or stock being cut and forged; that is, for each working stroke or cycle of the machine. Such means for actuating or tripping the clutch of the machine was very unsatisfactory, in that the actuating device would have to be moved along the floor so as to be in operable reach of the operator during the feeding of the length of stock or rod into the machine. Also, often times the operator would become unbalanced in reaching for the actuating or tripping device and would not get the stock or rod properly positioned in the machine, resulting in a faulty forging or in the machine not operating, or, the operator, due to being unbalanced, would often accidentally come in direct contact with the hot length of rod or stock which resulted in serious burns being incurred to his person.

Furthermore, the location of the actuating or tripping device on the floor was undesirable in that it created a tripping hazard for other workmen in the immediate vicinity of the machine, and, being in such a position, there was danger that a fellow workman or other person might accidentally step on the device, unintentionally setting the machine in motion and thereby injuring another who may be making adjustments or repairs to the machine.

According to the present invention, there is provided a clutch actuating or tripping mechanism which is incorporated within the machine itself, thereby eliminating all of the disadvantages and dangers as above described.

It is one of the objects of the present invention to provide an improved mechanism for actuating the clutch of stock cutting and forging machines and the like which is actuated and controlled by the stock itself.

It is another object of this invention to provide an improved clutch actuating or tripping mechanism for actuating the clutch of stock cutting and forging machines and the like which is rugged and, at the same time, simple and inexpensive in its construction.

It is a further object of the invention to provide an improved clutch actuating means for actuating the clutch of stock cutting and forging machines and the like which can be easily adjusted for various sizes of lengths of material or stock to be cut, and one that can be easily maintained.

It is still another object of the invention to provide an improved clutch actuating means for actuating the clutch of stock cutting and forging machines and the like which requires a minimum amount of attention from the operator and, at the same time, one which will greatly increase the rate of manufacture and production of such articles.

Various other objects and advantages of this invention will be more apparent in the course of the following specification and will be particularly pointed out in the appended claims.

In the accompanying drawings there is shown, for the purpose of illustration, one embodiment which my invention may assume in practice.

In these drawings:

Figure 3 is a section taken on line III—III of Figure 2;

Figure 4 is a section taken on line IV—IV of Figure 3; and,

Figure 5 is a section taken on line V—V of Figure 4.

Figure 1:
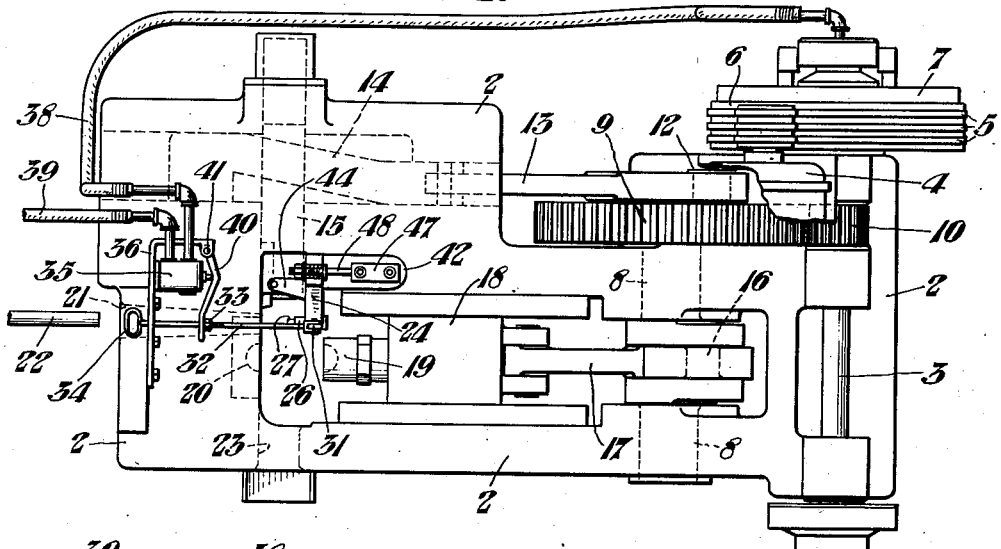
Figure 1 is a plan of a grinding ball manufacturing machine of the Ajax type with which my invention is shown incorporated.
Figure 2:
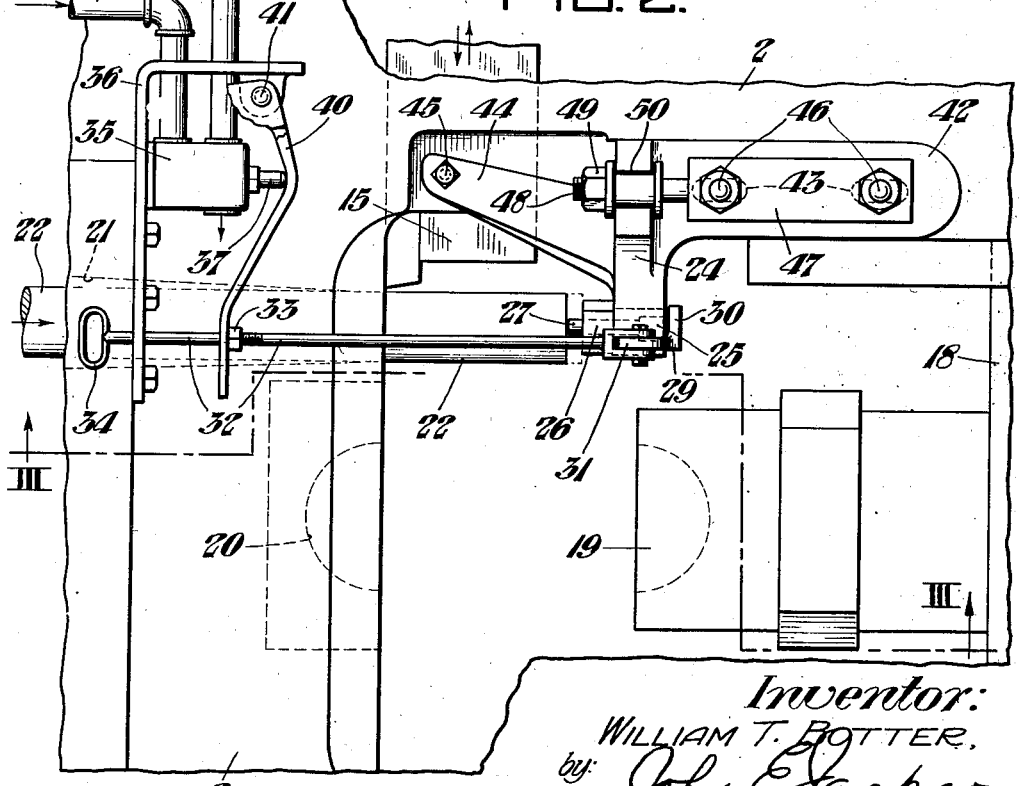
Figure 2 is an enlarged plan of the front of the same, showing more fully the details of my invention.

Referring more particularly to the drawings, there is shown, in Figure 1, a conventional type grinding ball manufacturing machine of the Ajax type with which my invention is incorporated. This machine comprises a base or frame 2, usually a heavy casting, having a drive shaft 3 suitably arranged on the back side thereof which is adapted to be driven preferably by means of a motor 4 suitably arranged on the base of the machine through the action of a belt 5 and a pulley or fly wheel 6 securely arranged on the outer end of the drive shaft 3. There is associated with the drive shaft 3, preferably at the outer end thereof, and the fly wheel 6, preferably a suitable air operated clutch 7. There is also suitably arranged on the base 2, forwardly of the drive shaft 3, a crank shaft 8 which is adapted to be driven by a gear 9 securely arranged thereon which is adapted to mesh with a pinion gear 10 securely arranged on the drive shaft 3. The gear 9 has arranged thereon a crank arm 12 to which one end of a connecting rod 13 is attached. The opposite end of the connecting rod 13 is secured to a movable sliding cam member 14 suitably arranged in the front end of the machine which is adapted to cooperate with a sliding shear or cut-off member 15 to actuate the same.

There is carried by the crank shaft 8 another crank arm 16 to which one end of a connecting rod 17 is attached with the opposite end thereof pivotally connected to a movable sliding head 18 suitably arranged in the frame, having a header die member 19 carried thereby which is adapted to cooperate with an oppositely disposed header die 20 suitably fixed in the base 2 of the machine. There is provided, in the front wall of the base, an opening or port hole 21 for the purpose of feeding the length of stock, work-piece or other material 22 into the machine, and there is also provided in the side wall of the base 2 preferably an opening or port hole 23 for the purpose of discharging the forged grinding balls therefrom after they have been formed.

According to the present invention, there is positioned forwardly of the machine, adjacent the shear or cut-off member 15, a vertically extending bracket 24 having a downwardly extending portion 25 in which there is arranged, directly opposite the stock feeding port hole 21 in the front wall of the base, an adjustable stop nut or stud-like member 26 having axially arranged therein a slidable pin or plunger 27. There is also pivotally arranged, on a pin 28 carried by the lower end 25 of the bracket 24, a vertically extending lever 29 having a downwardly extending offset flat portion 30 which is adapted to contact and cooperate with the inner end of the plunger or the pin 27, as is shown in Figure 5. There is pivotally connected to the upper end of the upwardly extending portion 31 of the lever 29 a horizontally disposed connecting rod 32 having an adjustable nut 33 mounted thereon intermediate its ends and with a handle portion 34 arranged on the outer end thereof.

There is also arranged on the forward end of the machine a clutch actuating or tripping device 35 which is mounted preferably on a suitable angle bracket 36 arranged on the base 2. The clutch actuating or tripping device 35 may be any one of the number of well-known types but the one shown is in the form of an air valve and has preferably a spring actuated piston valve or plunger 37 arranged therein for controlling the same; that is, for controlling the flow of air through the air line 38 to the air operated clutch 7. The air is admitted to this actuating device or air valve 35 through the inlet air line 39. There is provided a lever 40 for actuating the pin or plunger 37. The lever has one end thereof pivotally attached at 41 preferably to the bracket 36 and disposed oppositely from the spring plunger 37 carried by the actuating device with which it is adapted to cooperate. The outer end of the lever 40 has preferably arranged therein a hole through which the lever 32 is adapted to extend and so arranged as to abut against the adjustable nut 33 thereon with which it is adapted to cooperate. The bracket 24 also has associated therewith on one side thereof a rearwardly extending horizontal arm 42 having slotted holes 43 therein for purposes of attaching the bracket 24 to the base 2 and for adjusting the position of the same thereon, and another horizontal arm 44 extending forwardly and oppositely disposed from the horizontal portion 42 and having an adjustable set screw 45 arranged therein for the purpose of relieving the strain on the bracket 24 when the machine is in operation. The bracket 24 is attached to the base, preferably by means of stud bolts 46 arranged on top of the machine which are adapted to pass through the slotted holes 43 arranged in the horizontal portion 42 thereof. There is arranged above the horizontal portion 42, on stud bolts 46, a plate member 47 having a stud bolt 48 positioned in the outer end thereof with an adjustable nut 49 arranged thereon. The stud bolt 48 is adapted to lie preferably in a U-shaped groove 50 arranged in the upper end of the bracket 24 and is for the purpose of adjusting the horizontal position of the bracket on the stud bolt 46.

The conventional type machine for manufacturing grinding balls together with the improved clutch actuating or tripping device of my invention operates in the following manner:

The lengths of round bar stock, work-piece or other material are first preferably preheated and the hot lengths of material 22 then manually fed into the machine through the opening 21 in the front side thereof so as to abut against the stop nut 26. As the round bar stock is fed into the machine, the end thereof strikes the plunger or pin 27, as shown in Figure 3, and forces the same rearwardly, thereby causing the opposite end thereof to strike the flat portion 30 of the lever 29, thereby causing the same to rotate in a counter-clockwise direction about the pivot 28. In rotating in such a manner, the lever 29 moves, to the left, the connecting rod 32 to which it is attached, which, in turn, moves the lever 40 which controls the actuating or tripping device 35. The movement of the lever 40 moves the spring plunger 37 so as to permit air to flow thereinto through the air conveying pipes 38 to the air operated clutch 7, actuating the same so as to revolve the drive shaft 3 to set the machine in motion. When the drive shaft 3 is put in motion, it causes the shear or cut-off member 15 to move forwardly through the action of the gears 9 and 10, the connecting rod 13 and the sliding cam 14. As the shear or cut-off member 15 moves forwardly, it cuts a predetermined length of stock from the end of the hot length of rod stock 22 and carries it over to a position between the header dies 19 and 20. When the stock is in this position, the sliding head 18 is adapted to move so as to move the header die 19 carried thereby forwardly toward the header die 20, thereby grasping the stock and forming a grinding ball. The sliding head 18, together with the header die 19, then retracts and the ball is permitted to drop therefrom and to roll from the machine through the discharge hole 23 in the side of the base and the rod or stock 22 is moved or fed forwardly against the stop 26 in position to have a length cut therefrom for forming the next ball or forging. The length of hot stock or bar is continuously fed into the machine as above described until the bar is entirely used. It will be seen that at each time the end of the rod strikes the plunger 27 to set the machine in operation, the machine operates one working stroke, or, one complete cycle, and the clutch is disengaged after the forming of each ball. The handle portion 34 positioned on the end of the connecting rod 32 is for the purpose of tripping the device manually should it become necessary; that is, in case the lever 30 or pin 27 is in any way fouled or if any other part of the mechanism is accidentally prevented from functioning automatically.

If it is desired to change the size of the ball being formed or to adjust the amount of stock required to make a certain size of ball, the bracket 24 can be adjusted by loosening the nuts on the studs 46 and turning the adjusting nut 49 in the proper direction for the desired adjustment. If it is desired to materially change the size of the ball being made, it will be necessary to change the size of the adjusting nut 26 arranged on the downwardly extending portion 25, together with the plunger 27 carried thereby, so as to permit the machine to cut a longer or shorter length of stock of the length of bar stock, whichever is desired.

As a result of my invention, it will be seen that there is provided a mechanism for actuating the machine which is controlled automatically by the stock itself and so arranged that it will not function until the stock is properly positioned therein, and then without any undue attention from the operator. It will also be seen that my improved actuating mechanism can be easily and quickly adjusted for various sizes of grinding balls to be manufactured and that it greatly increases the rate of production thereof.

While I have shown and described one embodiment of my invention, it will be understood that this embodiment is merely for the purpose of illustration and description and that various other forms may be devised within the scope of my invention, as defined in the appended claims.

I claim:

1. In a machine of the class described, the combination of mechanism for controlling the operation thereof, including means for cutting a length of material from a work-piece, a clutch for actuating said cutting means, a stop member against which the end of the work-piece is adapted to strike as it is fed into the machine, movable means associated with said stop member which is adapted to be actuated by the end of said work-piece as it is moved into the machine against said stop member, and means responsive to the movement of said movable means actuating said clutch.

2. In a machine of the class described, the combination of mechanism for controlling the operation thereof, including means for cutting a length of material from a work-piece, a clutch for actuating said cutting means, an adjustable stop member against which the end of the work-piece is adapted to strike as it is fed into the machine, a movable member associated with said stop member which is adapted to be actuated by the end of the work-piece as it is moved into the machine against said stop member, and a lever pivotally arranged intermediate its ends on said machine, one end of said lever cooperating with said movable member with the other end thereof being connected to a clutch actuating means whereby said clutch actuating means is adapted to be actuated by movement of said movable means thereby actuating said clutch.

3. In a machine of the class described, the combination of mechanism for controlling the operation thereof, including means for cutting a length of material from a work-piece, an air operated clutch for actuating said cutting means, an adjustable stop member against which the end of the work-piece is adapted to strike as it is fed into the machine, a movable member associated with said stop member which is adapted to be actuated by the end of the work-piece as it is moved into the machine against said stop member, a lever pivotally arranged intermediate its ends on said machine, and means for controlling the air passing to said clutch to operate the same, one end of said lever cooperating with said movable member with the other end thereof being connected to said last mentioned means whereby said air clutch actuating means is controlled by movement of said movable means thereby actuating said clutch.

4. In a machine of the class described, the combination of mechanism for controlling the operation thereof, including means for cutting a length of material from a work-piece, an air operated clutch for actuating said cutting means, an adjustably arranged stop nut against which the end of the work-piece is adapted to strike as it is fed into the machine, a movable pin member axially arranged through said stop nut which is adapted to be actuated by the end of the work-piece as it is moved into the machine against said stop nut, a lever pivotally arranged intermediate its ends on said machine, and a valve for controlling the admittance of air to said clutch, one end of said lever cooperating with said movable pin with the other end thereof being connected to said valve whereby said valve is adapted to be controlled by movement of said pin thereby actuating said clutch.

5. In a machine of the class described for cutting lengths of material from a work-piece, the combination of mechanism for controlling the operation thereof, including means for cutting a length of material from the end of said work-piece, a clutch for actuating said cutting means, a stop member against which the end of the work-piece is adapted to strike as it is fed into the machine, movable means arranged with said stop member which is adapted to be actuated by the end of said work-piece as it is fed into the machine thereagainst into abutting engagement therewith, and means responsive to the movement of said movable means for actuating said clutch whereby the cutting means is actuated to sever from the work-piece a predetermined length of material.

6. In a machine of the class described for cutting lengths of material from a work-piece, the combination of mechanism for controlling the operation thereof, including means for cutting a length of material from the end of said work-piece, a clutch for actuating said cutting means, a positioning member against which the end of the work-piece is adapted to strike as it is fed into the machine, movable means arranged with said positioning member which is adapted to co-operate with and be actuated by the end of said work-piece when it is fed into the machine there-against into abutting engagement therewith, means for adjusting the position of said positioning member, and means responsive to the movement of said movable means for actuating said clutch whereby the cutting means is actuated to sever from the work-piece a predetermined length of material.

7. In a machine of the class described for cutting lengths of material from a work-piece, the combination of mechanism for controlling the operation thereof, including means for cutting a length of material from the end of said work-piece, a clutch for actuating said cutting means, a removable and adjustable stop member against which the end of the work-piece is adapted to strike as it is fed into the machine so as to position the same therein, a pin-like plunger member reciprocably arranged within said stop member and projecting therefrom, which is adapted to be actuated by the end of said work-piece when it is fed into the machine thereagainst into abutting engagement with said stop member, and means responsive to the movement of said movable pin for actuating said clutch whereby the cutting means is actuated to sever from the work-piece a predetermined length of material.

8. In a machine of the class described as defined in claim 7 wherein the means responsive to the movement of the movable means for actuating the clutch consists of an air valve which is adapted to control the actuation of an air actuated clutch.

9. In a machine of the class described, means for cutting a length of material from the end of a work-piece, means for actuating said cutting means, a stop member against which the end of the work-piece is adapted to strike as it is fed into the machine so as to limit the amount of said work-piece entering said machine to a predetermined amount whereby a predetermined length of material will be cut therefrom, movable means arranged with said stop member which is adapted to be actuated by the end of said work-piece as it is fed into the machine thereagainst into abutting engagement therewith, and means responsive to the movement of said movable means for operating said actuating means whereby the cutting means is actuated to sever from the work-piece a predetermined length of material.

WILLIAM T. BOTTER.